United States Patent [19]

Beele

[11] Patent Number: 4,702,444
[45] Date of Patent: Oct. 27, 1987

[54] SEALING SYSTEM

[75] Inventor: Johannes A. Beele, Ke Opmeer, Netherlands

[73] Assignee: Lycab AB, Karlskrona, Sweden

[21] Appl. No.: 798,754

[22] Filed: Nov. 15, 1985

[30] Foreign Application Priority Data

Nov. 30, 1984 [NL] Netherlands ............... 8403650

[51] Int. Cl.$^4$ ............................................. F16L 5/00
[52] U.S. Cl. ........................................ 248/56; 174/48; 174/151; 174/155
[58] Field of Search ............... 248/56, 49; 174/48, 174/151, 155

[56] References Cited

U.S. PATENT DOCUMENTS

| 120,884 | 11/1871 | Kidwell | 174/152 |
|---|---|---|---|
| 1,022,026 | 4/1912 | Guthrie | 174/155 |
| 3,282,544 | 11/1966 | Brattberg | 248/56 |
| 3,489,440 | 1/1970 | Brattberg | 248/56 |
| 4,291,195 | 9/1981 | Blomquist et al. | 248/56 X |
| 4,376,230 | 7/1981 | Bargsten | 174/48 |

FOREIGN PATENT DOCUMENTS

| 1465263 | 1/1969 | Fed. Rep. of Germany . | |
|---|---|---|---|
| 2524113 | 12/1976 | Fed. Rep. of Germany | 174/151 |
| 2908163 | 9/1980 | Fed. Rep. of Germany . | |
| 84538 | 3/1957 | Netherlands . | |

Primary Examiner—J. Franklin Foss
Assistant Examiner—David L. Talbott
Attorney, Agent, or Firm—Majestic, Gallagher Parsons & Siebert

[57] ABSTRACT

A sealing system for the sealing passage of cables or tubes, consisting of a rectangular frame, parallelepipedal blocks of resilient material, each block consisting of two identical halves, and featuring a bore adapted to the dimensions of the cables, compression means for compressing the blocks within the frame and retaining means, whereby the half blocks feature at least one groove transverse to the longitudinal axis of the bore on the outer surfaces parallel to said axis and the frame features corresponding grooves while the blocks are locked in place by the said retaining means that may rest in a groove of a half block.

9 Claims, 24 Drawing Figures

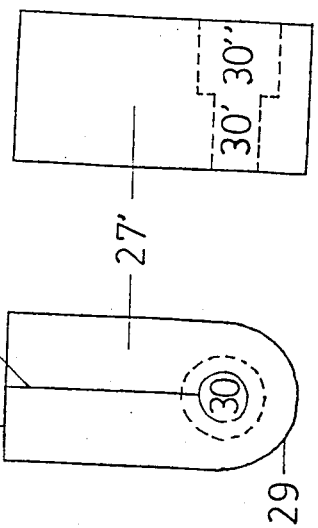
Fig.16
Fig.17
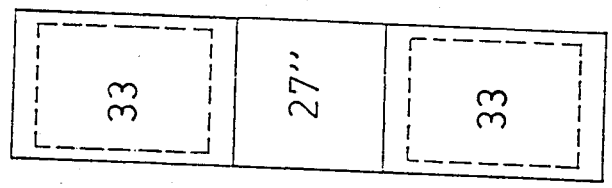
Fig.19
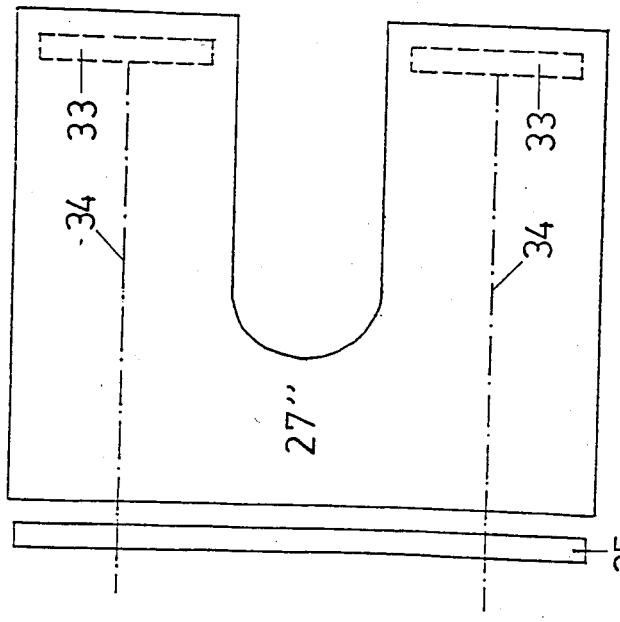
Fig.18
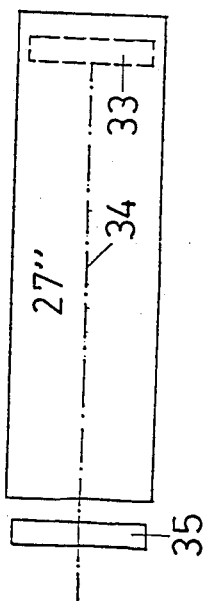
Fig.20

SEALING SYSTEM

The invention relates to a sealing system for the sealing passage of a cable, tube and the like through a wall, comprising a rectangular frame of a stiff material that can be sealingly mounted in an aperture provided in the wall, the side faces of which frame contain flanges which are crosswise of its plane, comprising also one or more parallelepipedal blocks of a resilient material, such as rubber, to be composed of two mutually identical halves, which blocks in their composite shape feature a bore adapted with slight tolerances to the form and dimensions of the cable to be led through and which blocks can be positioned to a fine fit into the aperture formed by the said flanges such that the halves are consistently fitted together so as to enclose a cable, whilst in addition means of compression are present which are capable of compressing the blocks placed in the frame aperture in the plane of this aperture such that a sealing force is exercised between the halves of the blocks, between the outer surfaces of the blocks, between the wall of the bores and the outside of the cables which they contain and between the outer surfaces of the blocks and the insides of the said flanges, whilst moreover retaining means are present which can, on the one hand, be supported by the said flanges and, on the other hand, retain the blocks in crosswise direction relative to the frame, an arrangement substantially as known from the Netherlands Pat. 84538. The sealing system described therein has some disadvantages, however. In the first place, the compressive force required for obtaining an effective seal is great both in a relative and in an absolute sense. Secondly, the retaining means have only a slight retentive force, so that the piled blocks upon compression bulge outwards from the plane of the frame. Thirdly, the retaining means afford a substantially free passage to heat rays. Fourthly, the great compressive forces make it necessary for the frame to have relatively thick flanges, which in the event of a fire again gives rise to a considerable heat flux to the side facing away from the fire. A fifth disadvantage is that the retaining means are difficult to install when the piled blocks have reached a certain height within the frame.

An object of the present invention is to eliminate the aforesaid disadvantages, which is accomplished according to the invention in that the half blocks feature at least one groove running transversely to the longitudinal axis of the bore on those outer surfaces which are parallel to the said axis, whilst the inside of at least one set of oppositely disposed flanges of the frame have a groove opposite which a groove of a half block can be positioned, whilst furthermore the retaining means consist of rod-shaped elements whose ends can be supported in two mutually opposite grooves in the flanges vis-á-vis these flanges, whereas the central part of a rod-shaped element may rest in a groove of a half block, thereby locking this half block transversely relative to the plane of the frame.

As the blocks are provided with grooves, a much smaller compressive force is required for obtaining an effective seal than in the absence of such grooves. In consequence of this reduced compressive force, the flanges can be constructed thinner. Because of the fact that less thick flanges suffice, the quantity of material that is available for heat transfer is also greatly reduced.

The retaining means employed according to the invention have a far greater retentive force, as the rod-shaped elements rest, at least partly, in the grooves of the flanges, so that the blocks are supported perpendicular to the longitudinal axis of the cables passed through. This design obviates a breakthrough of the wall of blocks. It also brings about an enhanced internal transfer of pressure, so that again a smaller requisite compressive force suffices. Because of the positioning of the rod-shaped elements, there is only a small transfer of heat in the direction of the cable lead-through.

An additional advantage of the invention is that the retaining means can be introduced when the frame has already been filled to a considerable extent with piled blocks, as the rods already project partly into the flange grooves, so that the angle of tilt at which the rod-shaped element is introduced can be taken less wide than in the known devices of this type. All the aforesaid qualities are conducive to fireproofness and compressive strength as well as to ease of assembly of the device according to the invention.

As a final point of interest, the presence of closed ducts with stagnent air reduces the average heat transfer coefficient throughout the entire thickness of the block wall.

A few embodiments of the sealing system according to the invention will now be described in more detail with reference to the accompanying drawings, whereby some further particulars of the invention will also become apparent.

FIG. 16 is a side elevation of a filler for the free space shown in FIGS. 13 and 14;

FIG. 17 represents a top view of the filler of FIG. 16;

FIG. 18 represents a top view of a filler corresponding with the filler of FIGS. 16 and 17 together with a clamping plate;

FIG. 19 represents a side view of the corresponding filler of FIG. 17;

FIG. 20 represents a front view of the corresponding filler of FIG. 17 with the clamping plate;

Figure 21:
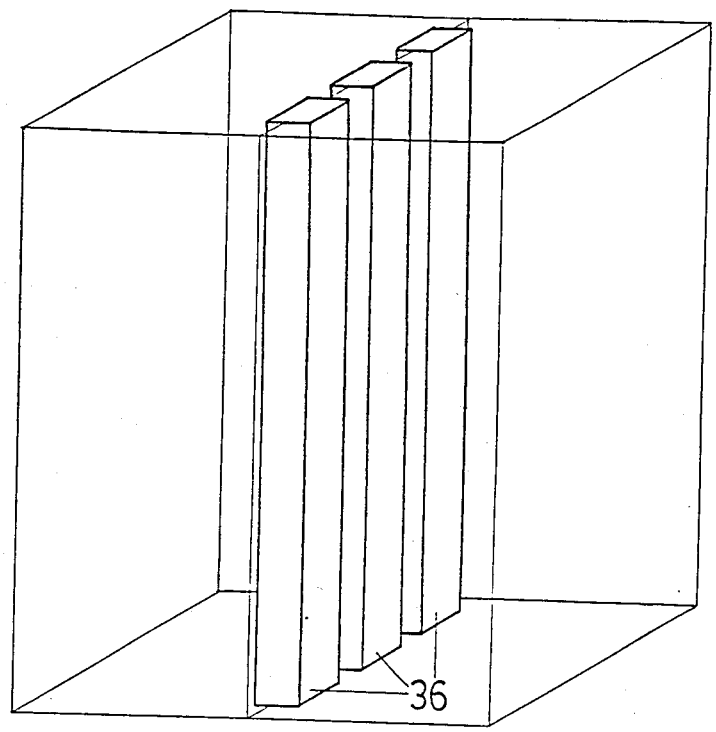
FIG. 21 is a diagrammatic representation of a different double-frame embodiment according to the invention.
Figure 24:
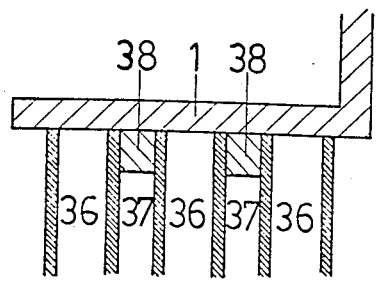

FIG. 24 schematically depicts the mutual positions of the sections, the frame and the spacing blocks according to FIG. 21 viewed in longitudinal section along the partitioning line of the double frame.

Figure 1:
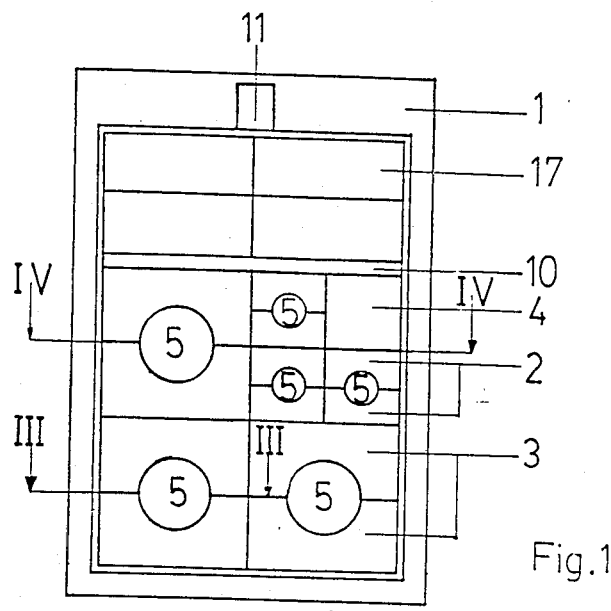
FIG. 1 represents a front view of an embodiment according to the invention.
Figure 2:
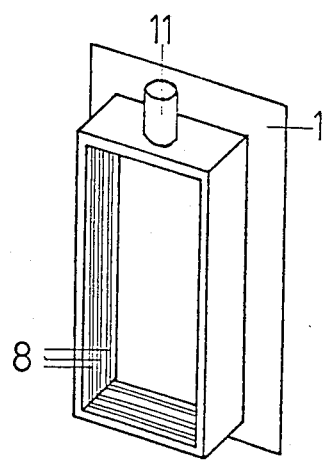
FIG. 2 shows a frame according to the invention without blocks in oblique projection.

FIG. 1 depicts a frame 1 packed with blocks 2, 3, 4, of which blocks 2 and 3 contain bores 5 for cables to be passed through. During assembly, the frame 1 of FIG. 2 is provided with blocks 2 or 3, depending on the diameter of the cables to be led through. In places where no lines have to be passed through, a blind block 4 may be inserted. The blocks are positioned such that the grooves 7 of the blocks match up with the grooves 8 of the frame (FIG. 2), whereby closed ducts 9 are created between the blocks and the frame and between the blocks amongst themselves. The blocks can be compressed by a pressure plate 10 with the aid of a screw (not represented) enclosed within a bushing 11. After the desired compression has been attained, blocks of pressure-tight material 17 are introduced into the vacant space 12 between the pressure plate 10 and the frame 1, whereupon the pressure plate can be released.

Figure 3:
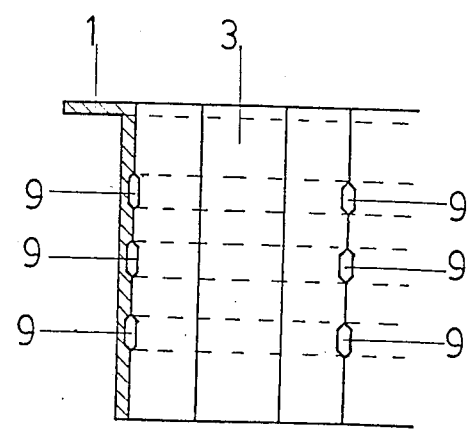
FIG. 3 is a cross-sectional view of the embodiment according to FIG. 1 taken along the line III—III.

FIG. 3 schematically shows the course of the resultant air ducts 9 in a section of the frame with the blocks installed.

Figure 4:
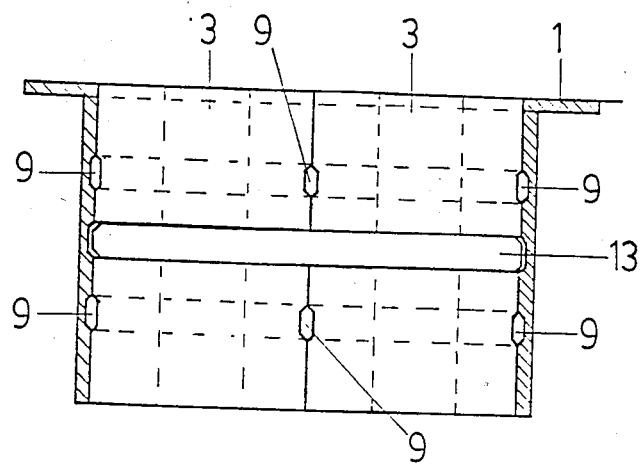
FIG. 4 is a cross-sectional view of the embodiment according to FIG. 1 taken along the line IV—IV.

FIG. 4 is a cross-sectional view in which a rod-shaped element is represented as retaining means 13, supported with its ends in the grooves 8 of the frame.

Figure 9:
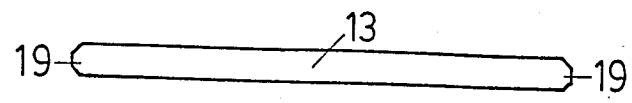
FIG. 9 represents a top view of a retaining means according to the invention.
Figure 10:
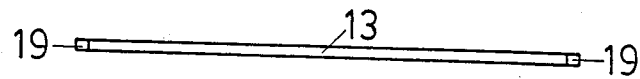
FIG. 10 represents a side view of a potential embodiment of a retaining means according to FIG. 9.
Figure 11:
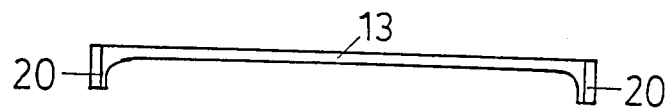
FIG. 11 represents a side view of a different potential embodiment of a retaining means according to FIG. 9.

The retaining means 13 can be designed in various fashions. The simplest design is a flat rod with truncated ends 19, as represented in FIGS. 9 and 10. For greater ease of attachment and stability of positioning, the retaining means 13 may be provided with folded ends 20, as represented in FIG. 11.

Figure 12:
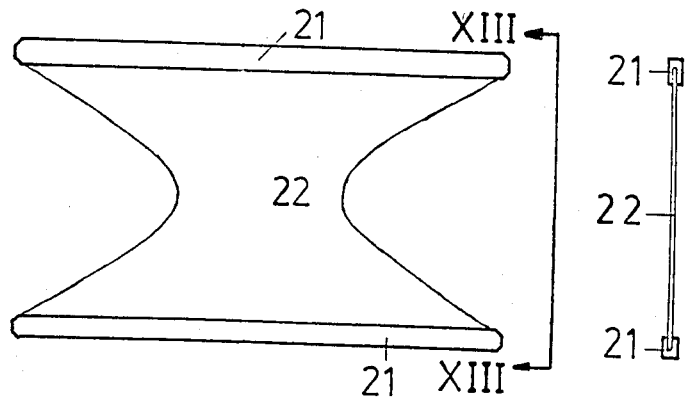
FIG. 12 represents a top view of yet another potential embodiment of a retaining means according to the invention.
Figure 13:
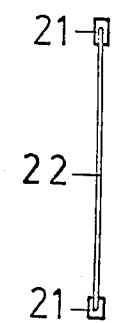
FIG. 13 represents a side view along the line XIII—XIII in FIG. 12.

According to another variant, as represented in FIGS. 12 and 13, the retaining means is composed of two sections 21 with a C- or U-shaped cross-section and a thin plate 22 which is clamped in the grooves of the two sections 21. With this design the sections 21 are individually supported in two parallel grooves 7 of the blocks 2 or 3 and grooves 8 of the frame.

Figure 5:
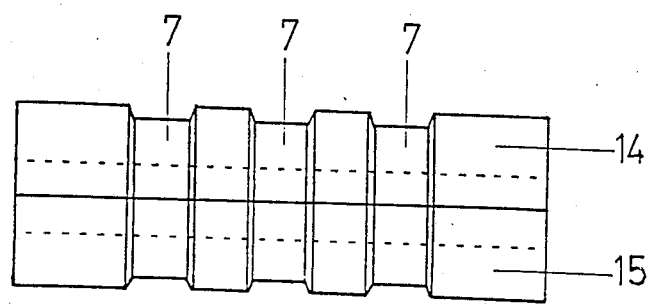
FIG. 5 depicts a block according to the invention in side elevation.
Figure 6:
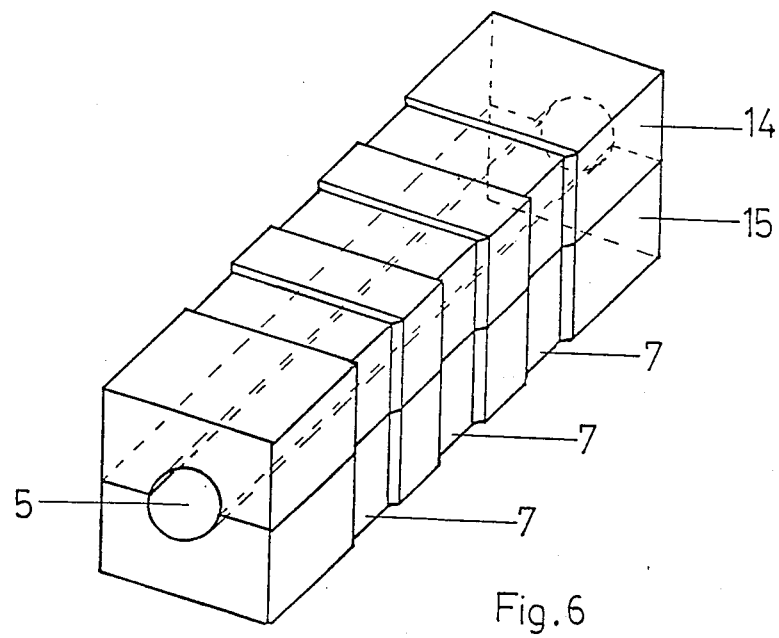
FIG. 6 shows a oblique projection of the block depicted in FIG. 5.

FIGS. 5 and 6 depict a block 2, consisting of two identical half blocks 14 and 15. This block may have one or more grooves 7 (three in this instance) round its circumference.

Figure 14:
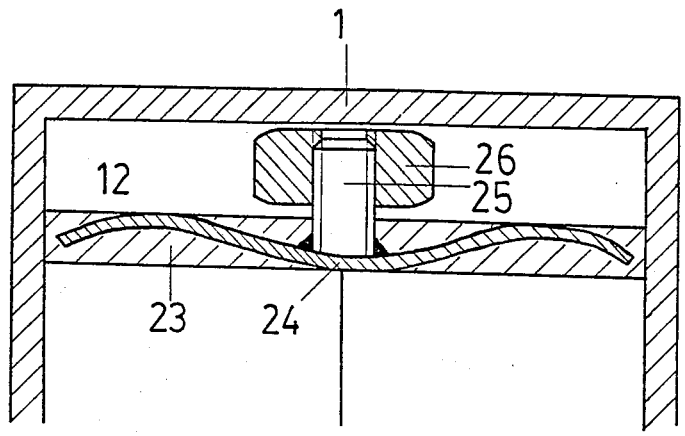
FIG. 14 shows a detail of a further embodiment according to the invention in the unclamped position.
Figure 15:
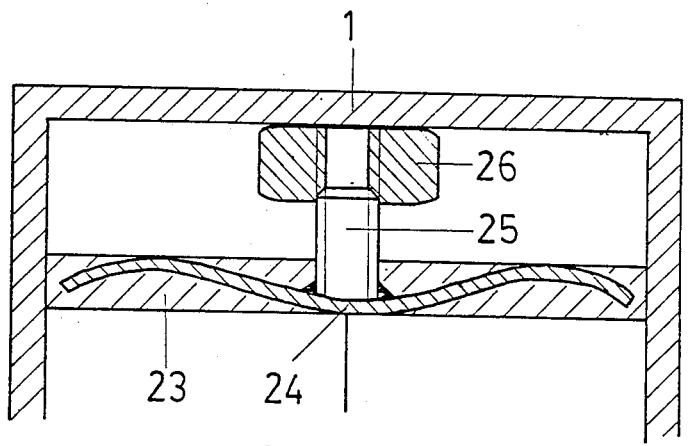
FIG. 15 shows the detail of FIG. 14 in clamped position.

A preferred embodiment of the design for the compression is shown in FIGS. 14 and 15. The pressure plate consists of a corrugated metal plate 24 embedded in a block 23 made of an elastic material, on which plate a threaded end 25 has been welded. On top of the threaded end 25 a nut 26 is provided. When the means of compression are introduced into the frame 1, the nut 26 on the threaded end 25 is in the position represented in FIG. 14. By turning the nut 26, the threaded end 25 and hence the pressure plate 10 is forced down. A potential end position of nut 26 on the threaded end 25 is represented in FIG. 15.

According to a more elaborate embodiment of the invention, provision is made for separate fillers 27.

FIGS. 16 and 17 depict a first filler 27' with one curved end face 29 and a bore 30, composed of a part 30' whose diameter corresponds with the diameter of the threaded end 25 and a second part 30" having a larger diameter which corresponds with the dimensions of the nut 26. From the bore 30 to the end face 31 runs a slit 32 which divides the block 27' virtually lengthwise into two.

Because of the resilience of the elastic material from which the block 27' has been made, the block can flexibly enclose the threaded end 25 and the nut 26.

FIGS. 18, 19 and 20 depict a U-shaped second filler 27" corresponding with the first filler 27'. The outer surfaces of this block 27" are straight and the first filler 27' fits snugly into the U-shape. Metal plates 33 are embedded in the U-shaped block 27" near the ends of the legs of the U-shape so as to be perpendicular to the longitudinal direction of the legs. From each plate 33 a screw spindle 34 runs all the way through the legs to emerge from the opposite surface, with the centre line of each screw spindle 34 parallel to the long direction of the corresponding leg of the U-shape.

A clamping plate 35 and nuts (not shown) fitting the screw spindles 34 are provided for tight joining together and compression of the fillers 27' and 27". By turning the nuts, the elastic material is squeezed together between the plates 33, and the fillers 27 hermetically seal the free space 12.

Figure 7:
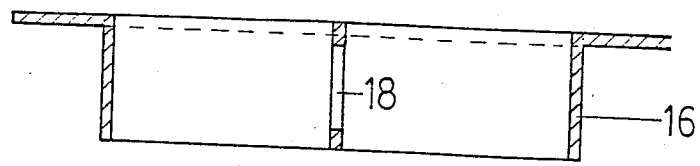
FIGS. 7 and 8 are a cross-sectional view taken along the line VII—VII of FIG. 8 and a front view of an embodiment according to the invention with adjoining frames, respectively.
Figure 8:
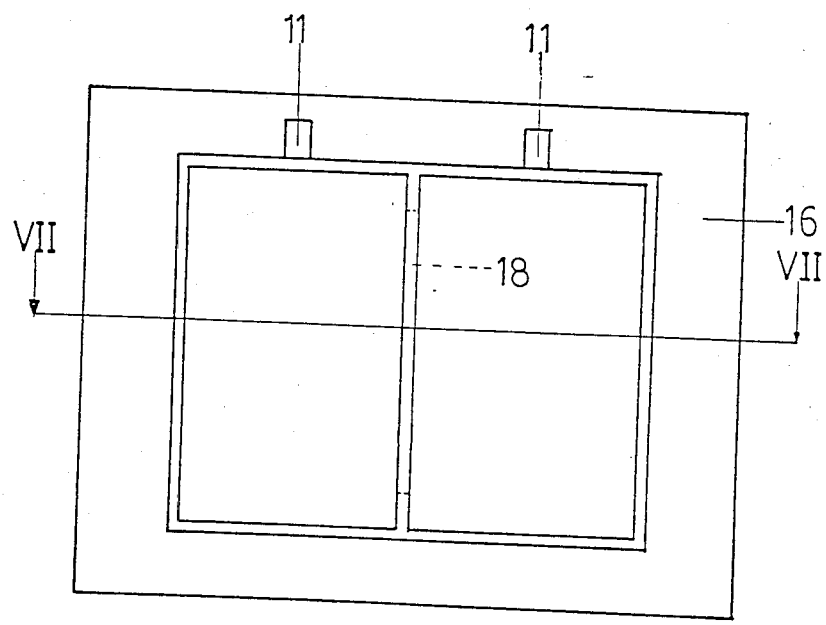

According to the invention, it is furthermore possible with adjoining frames 16, as represented in FIGS. 7 and 8, to attain an additional reduction of the heat transfer by the provision of an open slit 18 in the longitudinal partition. The amount of material to be used is thereby decreased as well.

Figure 22:
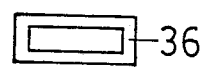
FIG. 22 is a cross-sectional view of a box section from FIG. 21.
Figure 23:
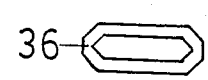
FIG. 23 is a cross-sectional view of an alternative box section.

According to the invention, the partition may also consist of a number of oblong hollow sections 36 which have been placed vertically between the two subspaces at regular intervals, as represented diagrammatically in FIG. 21. The examples of FIGS. 22 and 23 show that the sections 36 may have a rectangular or hexagonal cross-section.

The spaces 37 between the sections 36 will conduce to a further lessening of the heat transfer across the filled frame 1. As the outermost sections are located at some distance from the outer edge of frame 1, the section 36 will be sealed off from the ambient medium by the elastic material of the surrounding blocks 2.

Spacing blocks 38 may be fitted between the sections 36 to aid in correct positioning of the sections inside the frame 1, for instance as represented diagrammatically in FIG. 24.

What is claimed is:

1. A sealing system for the sealing passage of a cable, tube and the like through a wall, comprising a rectangular frame of a stiff material that can be sealingly mounted in an aperture provided in the wall, the side faces of which frame contain flanges which are crosswise of its plane, also comprising one or more parallelepipedal blocks of a resilient material, which blocks in their composite shape feature a bore adapted with slight tolerances to the form and dimensions of the cable to be led through and which blocks can be positioned to a close fit into the aperture formed by the said flanges such that the halves are consistently fitted together so as to enclose a cable, while in addition compression means are present which are capable of compressing the blocks placed in the frame aperture in the plane of this aperture such that a sealing force is exercised between the halves of the blocks, between the outer surfaces of the blocks, between the wall of the bores and the outside of the cables which they contain and between the outer surfaces of the blocks and the insides of said flanges, while moreover retaining means are present which can, on the one hand, be supported by the said flanges and, on the other hand, retain the blocks in crosswise direction relative to the frame, wherein the half blocks feature at least one groove running transversely to the longitudinal axis of the bore on those outer surfaces which are parallel to the said axis, while the insides of at least one set of oppositely disposed flanges of the frame have a groove opposite which a groove of a half block is positioned and the retaining means consist of rod-shaped elements whose ends are supported in two mutually opposite grooves in the flanges vis-a-vis these flanges, whereas the central part of a rod-shaped element rests in and entirely fills a groove of a half block along its entire length, thereby locking this half block transversely relative to the plane of the frame.

2. A sealing system according to claim 1, with adjoining frames being present having a common flange disposed transversely to the aperture, wherein the common flange is provided in its longitudinal direction with an open slit.

3. A sealing system according to claim 1, wherein the retaining means is provided with folded ends.

4. A sealing system according to claim 1, wherein the retaining means is composed of two sections with a C-shaped cross-section and a thin plate which is clamped in the grooves of the two sections.

5. A sealing system according to claim 1, wherein the means of compression consist of a rigid plate embedded in an elastic block, on which plate a threaded end has been fitted, while a nut is provided on top of the threaded end.

6. A sealing system according to claim 5 wherein the rigid plate consists of a corrugated metal plate.

7. A sealing system according to claim 1, wherein for the filling of the vacant space a first filler with one curved end face is provided, which block features a bore in two parts, the diameter of the first part corresponding with the diameter of the threaded end and the diameter of the second part corresponding with the dimensions of the nut, while a slit which divides the block virtually lengthwise into two runs from the bore to the other, straight end face, and a second, U-shaped, filler is also provided which corresponds with the first filler, into which the first filler fits snugly, and into which metal plates have been embedded near the ends of the legs of the U-shape, which plates are perpendicular to the longitudinal direction of the legs and from each of which a screw spindle runs so as to emerge from the opposite surface, while the centre line of each screw spindle is parallel to the long direction of the corresponding leg of the U-shape, and the fillers are tightly joined together and compressed by means of a clamping plate and nuts fitting the screw spindles.

8. A sealing system according to claim 1 further including a partition defining a pair of subspaces within the frame wherein the partition consists of a number of oblong hollow sections which have been placed vertically between the two subspaces at regular intervals.

9. A sealing system according to claim 8, wherein the outermost sections are located at some distance from the outer edge of the filled frame, and wherein spacing means have been provided between the sections.

* * * * *